June 23, 1925.
T. W. MILLER
1,543,506
METHOD OF MAKING HOLLOW RUBBER ARTICLES, SUCH AS NIPPLES, FINGER COTS, BULBS, AND THE LIKE
Filed Oct. 31. 1923
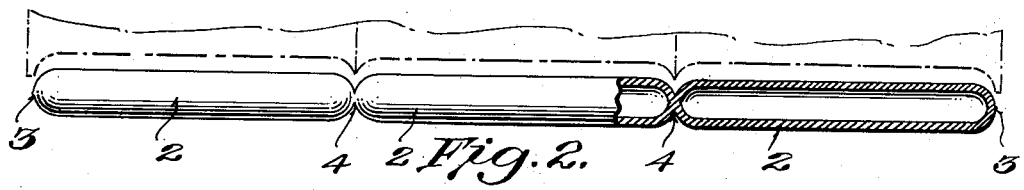
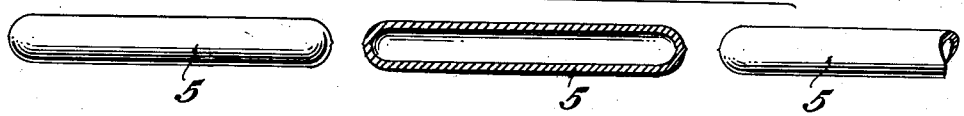
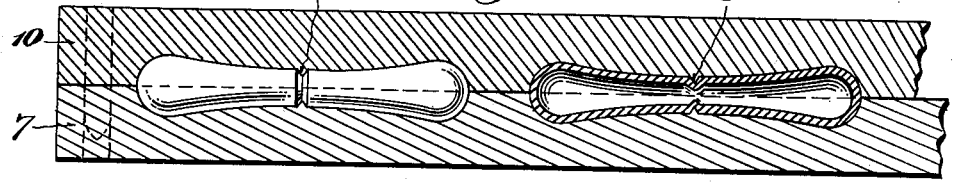
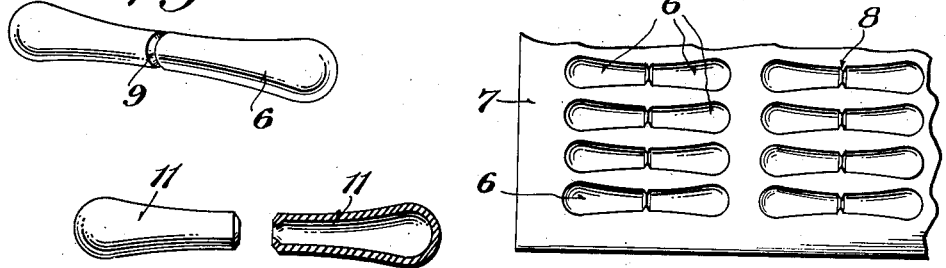
Inventor
Thomas W. Miller
by Percy B. Hills
Attorney Patented June 23, 1925.

1,543,506

UNITED STATES PATENT OFFICE.

THOMAS W. MILLER, OF ASHLAND, OHIO, ASSIGNOR TO THE FAULTLESS RUBBER COMPANY, OF ASHLAND, OHIO, A CORPORATION OF OHIO.

METHOD OF MAKING HOLLOW RUBBER ARTICLES, SUCH AS NIPPLES, FINGER COTS, BULBS, AND THE LIKE.

Application filed October 31, 1923. Serial No. 671,956.

*To all whom it may concern:*

Be it known that I, THOMAS W. MILLER, a citizen of the United States, residing at Ashland, county of Ashland, State of Ohio, have invented certain new and useful Improvements in Methods of Making Hollow Rubber Articles, Such as Nipples, Finger Cots, Bulbs, and the like, of which the following is a specification.

My invention relates to the method of manufacturing small vulcanized rubber articles closed at one end, such as nipples, finger cots, bulbs, and the like, and has for its object so to simplify the method as to effect a considerable economy in their manufacture.

This object I accomplish in the manner and by the means hereinafter described and claimed, reference being had to the accompanying drawing, in which:—

Figure 1 is a perspective view of a section of unvulcanized rubber tubing, as expressed from the ordinary tubing machine.

Figure 2 is a side elevation, partly in section, of said tubing section after it has been subjected to a rolling process and divided into hollow closed bodies, each substantially the length of two of the articles to be manufactured.

Figure 3 is a view of these bodies separated.

Figure 4 is a sectional view of a portion of a vulcanizing mold for treating said bodies.

Figure 5 is a plan view of a portion of one of said mold sections.

Figure 6 is a perspective view of one of the bodies as it comes from the mold.

Figure 7 is a view of said body divided to form two completed articles, one of the same being shown in section.

Similar numerals of reference denote corresponding parts in the several views.

The first step in carrying out my method consists in forming, by means of an ordinary tubing machine, a tube of suitable unvulcanized rubber compound and of the proper diameter and thickness of walls, said tubing as it is expressed from the tubing machine being cut into sections of suitable length, such as shown at 1 in Figure 1. These sections, which are of a length that readily may be handled, then are divided by a rolling process into a plurality of, say, three bodies, shown at 2 in Figure 2, said section 1, by said process, being closed at each end at 3, and at its division points 4 being brought together to form the three closed bodies, each of said bodies being of a length sufficient to form two of the completed articles. The section then is separated at the points 4, into the three separate closed bodies 5, as shown in Figure 3, and said bodies then are placed in the cavities 6, of one section 7 of a mold, said mold containing any number of cavities as may be desired, as shown in Figure 5. It will be understood that the cavities in said mold are to be of a shape properly to form the desired article, which in the present instance, is shown as a medicine dropper nipple. It will also be noted that each of said cavities is formed with a contracted portion at 8, which results in the formation of a groove 9 in the completed article, as shown in Figure 6. With the cavities 6 in the mold plate 7 charged, the upper mold plate 10, which is similarly formed with cavities, is applied thereto, and the mold then subjected to the usual vulcanizing heat, the result being that, due to the expansion of the air in the bodies 5 under the vulcanizing heat, the latter will expand to the configuration of their molds, thus assuming the shape of the finished articles, shown in Figure 6. These bodies being removed from the molds upon the completion of the vulcanizing process, may be cut at the grooves 9, each body thus producing two completed articles, in the present instance, medicine dropper nipples.

For most articles the expansion of the air therein during the vulcanizing process will be sufficient to shape the finished article to the interior contour of the molds, though, if necessary, a suitable blow agent may be placed in the tubing before it is rolled to the configuration shown in Figure 2.

The most important point of novelty in my improved method is found in forming two complete articles from a single body, the final step being simply that of cutting the same in two. And a further important novel point is the utilization of lengths of tubing formed of vulcanizable rubber composition for the initial blanks.

Having thus fully described my invention, what I claim as new and desire to secure by Letters Patent, is:—

1. The method of manufacturing hollow rubber articles closed at one end, which consists in first forming a tube of vulcanizable material, then dividing said tube into lengths and simultaneously shaping said lengths into hollow closed bodies each double the length of the completed article, then expanding and vulcanizing said bodies to a predetermined shape, and finally separating said bodies each into two sections, each section forming a completed article.

2. The method of manufacturing hollow rubber articles closed at one end, which consists in first forming a tube of vulcanizable material, then dividing said tube into lengths and simultaneously shaping said lengths into hollow closed bodies each double the length of the completed article, then expanding and vulcanizing said bodies to a predetermined shape and simultaneously forming grooves annularly therein and midway the length thereof, and finally separating said bodies at said grooves each into two sections, each section forming a completed article.

3. The method of manufacturing hollow rubber articles closed at one end, which consists in first forming a tube of vulcanizable material, then dividing said tube into lengths and shaping the same each into a plurality of hollow closed bodies each double the length of the completed article, then dividing said bodies from each other, then expanding and vulcanizing said bodies to a predetermined shape and simultaneously forming grooves annularly therein and midway the length thereof, and finally separating said bodies at said grooves each into two sections, each section forming a completed article.

In testimony whereof I hereunto affix my signature.

THOMAS W. MILLER.